April 10, 1951

T. C. SCHELLINGER 2,548,175

VALVE UNIT FOR HYDRAULICALLY
OPERATED TRANSMISSIONS

Filed March 26, 1947

INVENTOR.
Theodor C. Schellinger.
BY
Harness and Harris
ATTORNEYS.

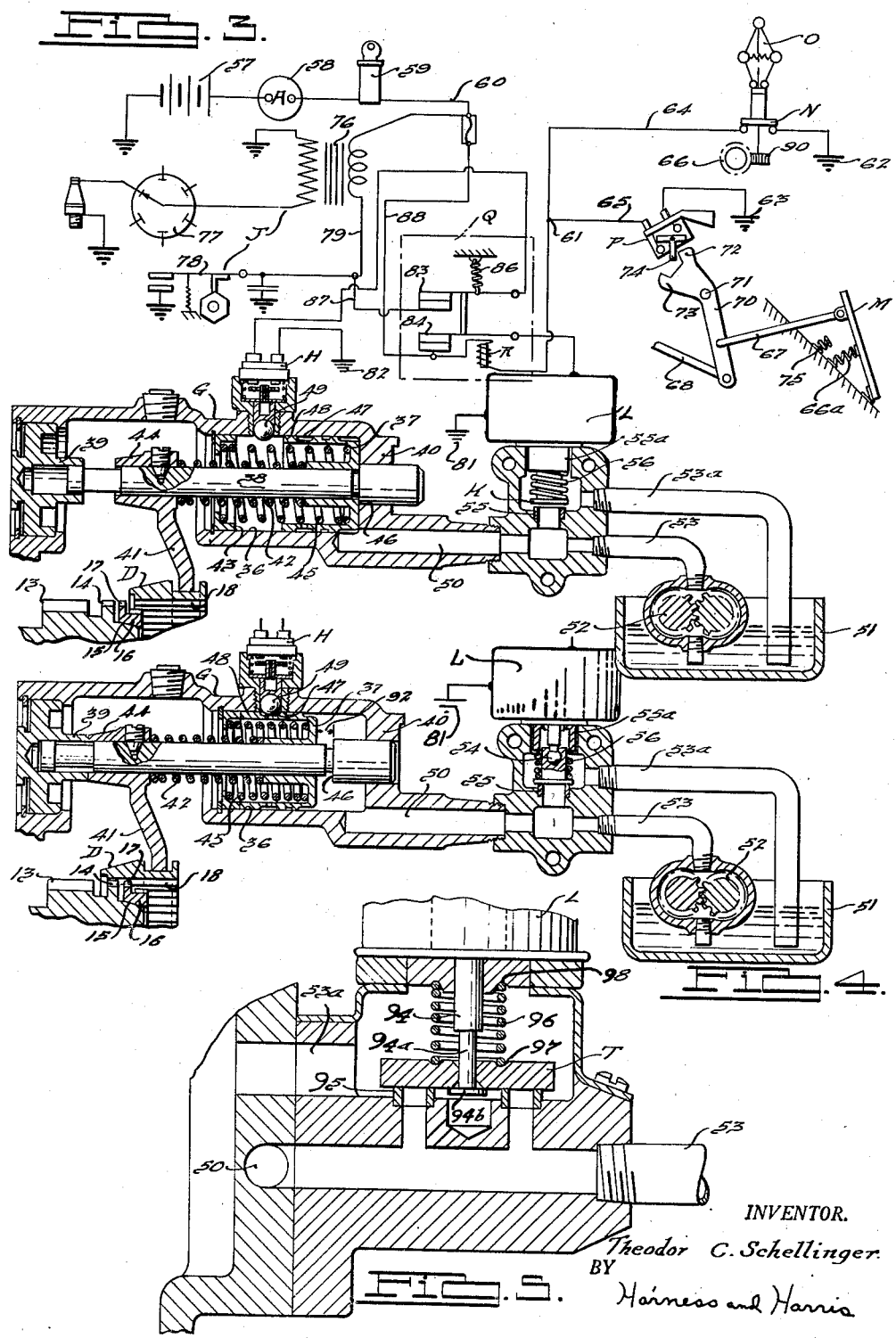

Patented Apr. 10, 1951

2,548,175

UNITED STATES PATENT OFFICE 2,548,175

VALVE UNIT FOR HYDRAULICALLY OPERATED TRANSMISSIONS

Theodor C. Schellinger, Highland Park, Mich., assignor to Chrysler Corporation, Highland Park, Mich., a corporation of Delaware Application March 26, 1947, Serial No. 737,392

9 Claims. (Cl. 74—472)

This invention relates to motor vehicles and refers more particularly to power transmission and control mechanism therefor.

My invention has particular reference to transmission systems in which the torque load is relieved, as by momentary interruption of the engine ignition system or by vehicle speed-responsive controls, in order to unload positively engageable drive control elements so as to facilitate disengagement of such elements. In such transmission systems it is now customary to provide a kickdown control on transmission downshift accompanied by ignition interruption such that when the accelerator pedal is depressed to the limit of its travel in throttle-opening direction then the down-shift will automatically take place so as to accelerate the vehicle in a more favorable drive ratio as in passing another vehicle or in climbing a steep grade. It is also customary to provide a vehicle speed responsive control on both up-shift and down-shift in the transmission. The up-shift control sets the transmission for a faster drive or step-up to occur at or above a predetermined vehicle speed and the vehicle speed responsive control on transmission down-shift, which is accompanied by ignition interruption, is such that when the vehicle is slowed down or brought to a temporary stop the transmission is automatically stepped-down and thus set for "break-away" acceleration in a favorable torque multiplying gear ratio. This invention relates to the hydraulic system. particularly the valving arrangement, employed to operate the servo-motor means which automatically causes the up-shifts and down-shifts referred to above.

In transmissions of the automatic or semi-automatic types, prior to this invention, servo-motor means of the pressure fluid type has been provided for power manipulative control of speed ratio change. Such servo-motors often employ oil or the equivalent as the operating medium and are known generally as "Hydraulically" operated transmissions. In arrangements of this type it has been customary to provide a valve system for the control of the oil to the servo-motor and usually the valve system is itself operated by a motor such as a solenoid which lends itself to convenient control by a speed responsive governor, a kickdown switch, a dash switch, or other controls. In the past, valve systems of the type disclosed in the copending Syrovy et al. application, Serial No. 596,842, filed May 31, 1945, now Patent No. 2,490,604, dated December 6, 1949, have been used to control the flow of oil to and from the hydraulically operated, speed responsive, shift cylinder which constitutes the servo-motor means. These valve systems usually include a series of slide valves such as a pilot valve, a main control valve and a pressure relief valve with the attendant valve guides, springs, stops and fluid passageways. It is obvious that such a valve control system is expensive to manufacture due to the large number of parts required and, furthermore, because of the large number of slidably engaged parts, the danger of sticking parts is greatly increased, consequently the efficiency and reliability of such a system is endangered. It naturally follows that the cost of operation of such a system is liable to be expensive due to the large number of parts subject to wear and the increased possibilities for repair bills due to mechanical failures. I have determined that slide valves are more susceptible to failure in a system of this type than flapper, plate, poppet or ball type valves due partly to the possibilities of dirt or other solid particles, suspended in the fluid medium, becoming lodged between the slidable valves and their adjacent guiding surfaces thus causing sticking of these contiguous slidable parts. Another reason for the frequent failure of slide valves in a system of this type is the fact that slide valves generally have portions in slidable engagement with their guideway which are thus subject to sticking, whether the valves are in open or closed condition, whereas a flapper, plate, poppet or ball type valve is completely removed from its seat when the valve is opened and the flow of fluid across the opened valve and the seat washes these surfaces clean so that a non-sticking seal may be maintained between these contiguous elements.

One object of this invention is to replace the multiple slide valve control system of the type disclosed in the Syrovy et al. application with a simple, single valve system that will satisfactorily perform all the functions of the group of pilot, control and relief valves heretofore used in a system of this type.

Another object of this invention is to replace the multiple slide valve control system with a simple, single valve control system which is less susceptible to mechanical failure due to the use of a flapper, plate or poppet type valve instead of slide valves which are frequently rendered inoperative due to the lodging of dirt particles, or the like, between the slidably engaged surfaces.

Another object of this invention is to provide a single valve control system that can be operated by a relatively small size solenoid due to use of the oil pressure plus the solenoid pull to overcome the resistance offered by the valve, seat-retaining, spring means.

Another object of this invention is to provide a valve control means for the shift cylinder wherein the power required to operate the valve is largely derived from the pressure of the fluid operating medium.

Another object of my invention is to provide a simplified and improved control system for a transmission of the step-up and step-down type wherein ratio changes are produced by power shifts under control of the driver and in response to the speed of travel of the motor vehicle.

A further object is to provide an improved transmission operating system for control of positive interengageable drive control elements such that tendency of the parts to bind or fail to operate is obviated.

Further objects and advantages of my invention will be more apparent from the following illustrative embodiments, reference being had to the accompanying drawings, in which:

Fig. 3 is a diagrammatic view illustrating my control system, a portion of the system being shown in sectional elevation;

Fig. 4 is an enlarged elevational view partly in section illustrating the construction of the solenoid-controlled valve shown in the Fig. 3 system; and Fig. 5 is an enlarged elevational view partly in section of a modification of my invention which may likewise be adapted to the Fig. 3 system.

Figure 1:
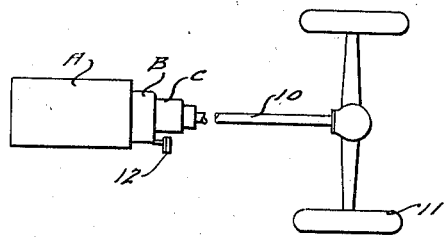
Fig. 1 is a diagrammatic top plan view of my power transmission applied to a motor vehicle.

In Fig. 1 the motor vehicle is of any desired type, that illustrated being of standard practice wherein an engine A transmits its drive through a clutch B, transmission C and a propeller shaft 10 to drive the rear ground wheels 11. A fluid coupling and main friction clutch of known type such as that illustrated in said copending application may be provided within the housing B, the clutch being releasable to uncouple the engine from the transmission by means of a conventional clutch pedal 12. Rearwardly of clutch housing B is the transmission C of any type incorporating positively engageable drive control elements which resist relative disengagement when under substantial torque load. Accordingly this makes the use of some form of torque unloading means desirable as an incident to transmission step-down by release of the torque loaded drive control elements.

The illustrated transmission C is of the underdrive type although other types including overdrive transmissions of known commercial form may be employed if desired. This transmission C comprises an input pinion 13 carrying clutch teeth 14 and a friction cone 15 which is constantly engaged by a blocker 16 carrying blocker teeth 17 adapted to be engaged by the teeth 18 of a clutch sleeve D when the latter is biased forwardly under asynchronous conditions in the rotation of pinion 13 and sleeve D. This sleeve D together with clutch teeth 14 comprise relatively movable drive control elements for effecting step-up and step-down manipulation of the transmission.

Blocker 16 is lightly urged against the cone 15 by a spring 19 and has a lost-motion connection at 20 with the slotted end of a hub 21 of a high speed gear 22 such that the blocker 16 may move relative to sleeve D between two positions blocking the sleeve, such positions being known as drive block and coast block depending on whether pinion 13 appreciably leads or lags the speed of the sleeve. The sleeve D is splined on hub 21 at 23, the arrangement being such that whenever sleeve D is rotating faster or slower than pinion 13 then the blocker teeth 17 will be aligned with the ends of the teeth of sleeve D and this prevents shift of the sleeve teeth into contact with pinion teeth 14. However, when the pinion 13 is rotating faster than sleeve D and gear 22, and the sleeve is biased forwardly into blocked position, the driver may release the accelerator pedal to cause the engine and driven pinion 13 to slow down and as the pinion and sleeve pass through a synchronous relationship the blocker is moved from its drive blocking position toward its coast blocking position and when mid-way will unblock the sleeve and allow its teeth 18 to pass between the blocker teeth 17 and clutch with teeth 14.

Gear 22 is loose on the output shaft 24 whereas pinion 13 is a fixed part of the input shaft 25. Loose on the output shaft 24 is a low speed gear 26. A manually shiftable clutch E, which has a splined connection with a hub 27 fixed to shaft 24, has associated therewith any commercial type of blocker synchronizers 28 such that clutch E may be shifted either forwardly to high range or rearwardly to low range to synchronously clutch shaft 24 either with the high speed gear 22 at the teeth 29 or with the low speed gear 26 at the teeth 30. Manual shifts of clutch E are facilitated by release of the main clutch at B by means of the usual clutch pedal 12.

Pinion 13 has constant mesh with a countershaft gear 31 operating through an overrunning clutch F to drive the countershaft cluster 32 comprising gears 33 and 34 respectively which are in constant mesh with gears 22 and 26. For reverse an idler gear (not shown) having constant mesh with gear 34 is shifted rearwardly to mesh with gear 35 fixed on shaft 24, clutch E being maintained in its illustrated neutral condition during reverse drive.

When clutch E is shifted rearwardly to clutch gear 26 to shaft 24 then an overrunning, relatively slow speed, low range drive or first speed is transmitted from shaft 25 to shaft 24 by way of gear 31, overrunning clutch F, and gears 34 and 26. If at such time sleeve D is biased forwardly into drive block condition and the shaft 25 allowed to coast down by overrunning release of clutch F, then when teeth 14 are thus synchronized with sleeve D the latter, as aforesaid, will be unblocked and will clutch with teeth 14 to effect a step-up in the transmission during coasting conditions so that now a two-way, relatively fast speed, low range drive or second speed is effected from shaft 25 through sleeve D to gear 22 thence by way of gears 33, 34, and 26 and through clutch E to shaft 24, clutch F overrunning.

If clutch E is shifted forwardly to clutch gear 22 to shaft 24 then an overrunning, relatively slow speed, high range drive or third speed is transmitted from shaft 25 to shaft 24 by way of gear 31, overrunning clutch F, gears 33 and 22, thence through clutch E to shaft 24. In the same manner as aforesaid in connection with step-up from first to second, sleeve D may be clutched under coast synchronous conditions with teeth 14 to effect a two-way, relatively fast speed, high range drive or direct fourth of a speed ratio of 1 to 1 from shaft 25 directly through sleeve D and clutch E to shaft 24, clutch F overrunning. A more complete description of the specific transmission described in this application is set forth in the Syrovy et al. application, Serial No. 596,842, filed May 31, 1945. Normal starting drive is usually initiated through the third speed, high range gear ratio after which an automatic upshift to direct drive is accomplished.

Speed responsive governor means O is provided to control forward bias of sleeve D as well as rearward bias thereof, as will presently be more apparent. Furthermore, during drive in either second or fourth speed, a downshift to first or third speed respectively may be effected under control of the driver preferably by a full depression of the accelerator pedal.

Referring now to Fig. 3, I have illustrated servo-motor means in the form of a fluid actuated motor or shift cylinder G for controlling shift of sleeve D, this motor comprising a cylinder 36 slidably receiving a piston 37 which slidably receives a rod 38 which is mounted to reciprocate in the guideways 39, 40. Fixed to this rod 38 is the collar 44 of a yoke 41 which is connected with sleeve D to effect shift thereof. A relatively small force, pre-loaded, engaging spring 42 is threaded on rod 38 and is disposed between piston 37 and yoke 41 to provide a lost-motion thrust transmitting connection between piston 37 and yoke 41 such that piston 37 may move forwardly or to the left for its power stroke without moving teeth 18 of sleeve D into engagement with the pinion teeth 14. During this power stroke, this forward shift of piston 37 is limited by abutment 43 in advance of the full clutching shift of sleeve D. Subsequent limitation of forward movement of sleeve D results from engagement of the yoke collar 44 with the rear end of guideway 39. A relatively large force, pre-loaded, kickdown spring 45 is disposed between abutment 43 and piston 37 and serves to return the piston and sleeve D to the Fig. 3 position when cylinder 36 is vented. The spring 45 is thus adapted to effect disengaging bias of sleeve D relative to teeth 14.

Rod 38 has a shoulder 46 which in Fig. 3 engages the face of piston 37 but which, when the piston and rod 38 are moved to the end of their forward strokes, see Fig. 4, is spaced rearwardly of the piston to provide a gap 92 equal to the difference in length of the strokes of the piston and rod. This gap is utilized to close an ignition control switch H for interrupting the engine ignition system J. Piston 37 is provided with an annular groove 47 formed in its skirt portion to define the cam portion 48 which operates the ball actuator 49 for closing switch H.

The pressure fluid supply system has been diagrammatically represented in Fig. 3 and comprises a suitable supply 51 of oil which is usually at the transmission sump. A pump 52, preferably driven by the transmission output shaft 24, draws the oil from the supply 51 for delivery under pressure through pipe 53 thence to the passage 50 under control of a flapper valve K. When the valve K is closed the oil is forced directly from the pump 52 through passages 53 and 50 to shift cylinder G where it moves the piston 37 and shift rod 38 to the left thus causing yoke 41 to shift sleeve D so as to cause an up-shift to second or fourth speed depending on whether clutch E is engaged with first speed gear 26 on third speed gear 22. Valve K is closed by the spring pressure of valve spring 56 when the solenoid L is de-energized and the solenoid plunger 54 is in its extended position. It will be noted that under such conditions the valve K acts as a main control valve as well as a relief valve for as soon as the pressure in the oil line from the pump 52 to the cylinder G exceeds that necessary to move the piston 37 to its up-shifted position by a predetermined desired amount, then the valve K will be raised off its seat 55 against the pressure of spring 56 and oil will escape to the supply sump via return line 53a and this maintains a predetermined pressure in the line 50. When solenoid L is energized the solenoid plunger 54 is retracted and valve K is drawn up into valve guideway 55a off valve seat 65 so that oil now flows from the pump 52 through the line 53 to open valve K and back to the supply sump via return line 53a. The open valve K prevents sufficient pressure developing in line 50 to move piston 37 against the force exerted by the piston retaining spring 45. It will be noted that the solenoid is energized only in first and third gears and consequently in second and fourth gears, where most of the actual driving time is accumulated the solenoid is in a de-energized condition. This arrangement increases the life of the solenoid and accordingly renders the system more economical than one where the solenoid remains energized during the majority of the driving time.

In Fig. 3, the valve K is shown raised by operation of the solenoid L which is electrically energized to raise the valve against the force of the return spring 56 and to maintain the valve in such position. Fig. 4 shows the valve in closed position with the cylinder piston 37 moved to up-shifted position.

Energization and de-energization of solenoid L is brought about by operation from one position to another of either of two control members respectively actuated or controlled by vehicle speed and by the driver. Electrical circuit means for this purpose includes a grounded storage battery 57 for supply of electrical energy through ammeter 58 and ignition switch 59 to a wire 60 thence through line 88 and solenoid R of relay Q to a terminal 61 whence either of two parallel grounds 62 or 63 will complete a circuit. Energization of solenoid R closes connected contacts 83 and 84 against the tension of spring 86. On closing of contract 84 electrical energy is supplied, via shunt connection through the closed contact 84, to the solenoid L and thence to ground at 81. In Fig. 3 the solenoid L is energized as a result of the energization of the circuit which grounds the terminal 61 through wire 64 at 62 through a closed governor switch N.

This governor switch N constitutes one of the two aforesaid control members for solenoid L and is opened at predetermined vehicle speeds under control of a governor O driven at 66 by some suitable gear means 90 which operates at a speed proportionate to vehicle speed such as the transmission countershaft or the driven shaft 24, if desired.

The other parallel circuit for grounding terminal 61 at 63 is controlled by a kickdown switch P which is open in Fig. 3 as accelerator M is released under control of its return spring 66a. The accelerator thus constitutes the other of the two aforesaid control members for solenoid L and is suitably connected by well known means with the usual engine carburetor throttle valve by linkage 67, 68 which serves to open and close the throttle valve. Interposed in the throttle valve operating linkage 67, 68 is a lever 70 pivotally supported at 71 and having spaced fingers 72, 73 for operating the switch finger 74 of the snap type switch P. The arrangement is such that as the throttle valve approaches its wide open position by depressing accelerator M, finger 73 is engaged with switch finger 74 so that switch P is closed with snap action during approximately the last 5° or so of throttle opening movement.

If desired a pick-up spring 75 may be located at a suitable point in the throttle operating mechanism such that it imposes a yielding load on the accelerator pedal M, in addition to the return spring 66a, at the time when the pedal moves to close switch P. The driver thus will not accidentally close switch P as he nears the end of the accelerator pedal stroke as a noticeable additional effort is required to depress the accelerator to bring the kickdown switch into operation. When the accelerator is then released the finger 72 operates to open the switch near the fully released position of the accelerator. The parts are so arranged that switch P will be opened by finger 72 whenever the accelerator pedal is fully released.

The ignition system J is conventional and includes coil 76, distributor 77, and breaker 78. From the primary side of the coil an ignition grounding line extends by wires 79 and 87 through the closed contacts 83 to the interrupter switch H and then to ground at 82.

In operation with the parts arranged as in Fig. 3, the vehicle is at a standstill with the ignition on and the engine idling. With transmission C in neutral and the vehicle at standstill the governor switch N is closed thus effecting energization of relay solenoid R which closes contacts 83 and 84 and supplies current for the energization of solenoid L which opens valve K to vent hydraulic motor G and maintains sleeve D released as shown. Interrupter switch H is open as the ball actuator 49 is free of the piston 37. Kickdown switch P is open and the accelerator pedal is released.

For an ordinary forward drive, the operator shifts the sleeve E forwardly to high range and by depressing the accelerator pedal the vehicle is driven in third speed up to any desired speed. At some predetermined speed of vehicle travel, as at approximately 6 to 7 miles per hour in first speed, or 12 to 14 miles per hour in third speed, or higher or lower as desired, governor O operates to open switch N. This opens contacts 83 and 84 and deenergizen solenoid L whereupon valve K is closed by its spring 56 to shut off by-pass line 53a so as to cause pressure to build up in passage 50. Piston 37 then moves forwardly for its up-shift stroke, this movement compresses springs 45 and 42 and momentarily closes interrupter switch H which, however, does not interrupt the ignition system because switches N and P are open and this opens contacts 83 and 84 which breaks the circuit through the interrupter switch H. When the piston 37 is at the end of its forward stroke switch H is also open as the ball 49 is then aligned with the piston groove 47.

When piston 37 moves forwardly spring 42 operates to move rod 38 and sleeve D forwardly only until sleeve D comes up to its drive blocked position where it remains until the vehicle driver releases the accelerator pedal for accomplishing the up-shift to fourth speed by allowing the engine to slow down sufficiently to synchronize the speeds of teeth 14 and sleeve D and to effect unblocking action of the blocker 16. The drive after engagement of sleeve teeth 18 and pinion teeth 14 then takes place in the cruising fourth or direct drive.

When the governor O operates to open switch N, it is apparent that this de-energizes the relay solenoid R which permits spring 86 to open contacts 83 and 84 so that the solenoid L is then de-energized and the valve K closed so that pressure fluid is pumped directly from the pump 52 to the shift cylinder G where the piston 37 will be moved forward to shift sleeve D into engagement with teeth 14 of pinion 13 and thus accomplish the up-shift to fourth speed.

Down-shift from fourth-speed back to third speed is effected either by manually closing the kickdown switch P or by the automatic closing of governor switch N. Thus when the driver desires to effect the down-shift from fourth speed, he fully depresses the accelerator M to close switch P and inasmuch as the engine is delivering its full power at the attendant wide-open throttle, it is desirable to effect torque relief at the teeth 14, 18 to facilitate the release of sleeve D for the down-shift. Therefore, when switch P is closed this not only energizes solenoid L to vent motor G but also energizes relay solenoid R which closes contacts 83 and 84 which coincidentally affords a circuit through interrupter switch H to be grounded at 82 when switch H is closed by the rearward movement of piston 37. When motor G is vented, piston 37 moves rearwardly a small amount independently of sleeve D under the force of spring 45 in taking up the aforesaid gap 92 until the piston engages the rod shoulder 46. When the piston moves to take up the gap 92, cam 48 engages actuator 49 and closes the switch H thereby completing the grounding circuit at 82 so as to interrupt the ignition system. This instantly unloads the torque at the teeth of sleeve D whereupon the piston 37 completes its rearward or return stroke back to the Fig. 3 position moving with it, because of shoulder 46, the rod 38 and sleeve D as a unit. As soon as the sleeve D clears the teeth 14 the ignition is restored to normal operation because ball 49 clears the cam 48 and opens switch H. When the accelerator M is later released, then fourth speed is again restored as aforesaid provided the vehicle speed is still such that switch N is open. If desired, any well known form of upper limit control on the accelerator kickdown may be provided so that, above a predetermined relatively high vehicle speed, the accelerator pedal controlled kickdown is rendered inoperative.

For the other down-shift from fourth speed to third speed under control of the vehicle speed governor means O, it is only necessary to reduce the vehicle speed to or below the speed at which governor switch N closes. This energizes solenoid L and motor G effects the down-shift just as outlined in connection with the closing of kickdown switch P.

Figure 2:
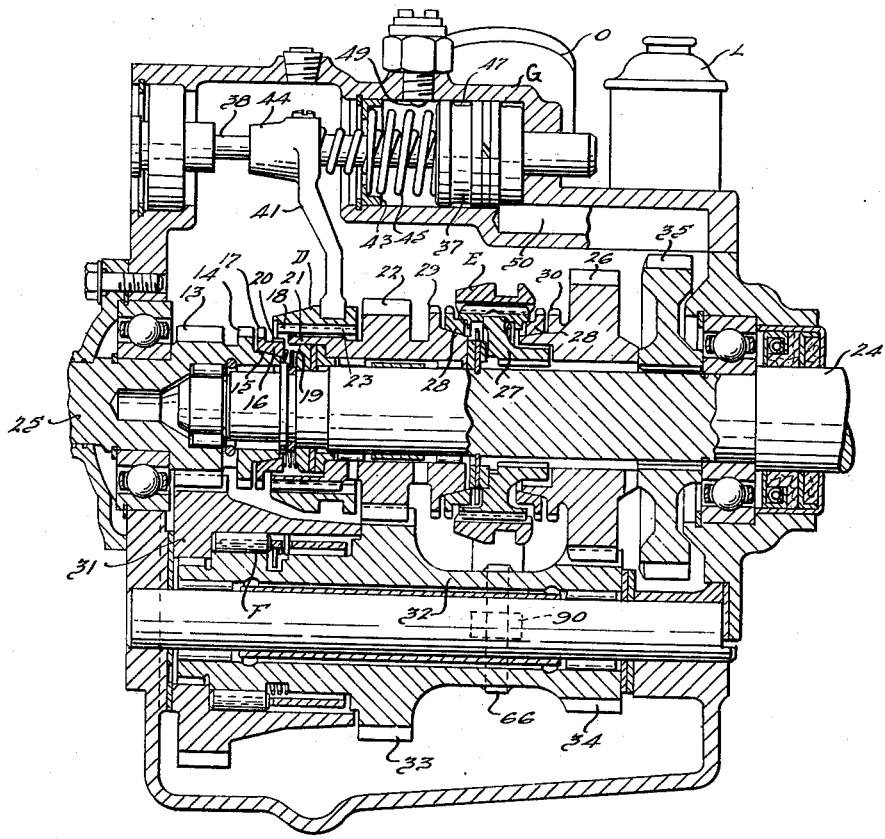
Fig. 2 is a sectional elevational view of a typical transmission to which my invention has been applied for illustrative purposes.

When the clutch E is in its rearward low range position, then the up-shift and down-shift under control of sleeve D will be just as set forth in connection with the corresponding functions occurring for the high range setting. However, if governor O is driven from the countershaft, as at 66 in Fig. 2, then the governor O will function at somewhat lower car speeds depending on the gear ratios for first and second compared with third and fourth as will be readily understood.

In Fig. 5, I have illustrated a modification of the combination control and relief valve shown in Fig. 4. The solenoid L has a plunger rod 94 with a reduced outer end portion 94a on which is slidably mounted the rectangular shaped plate valve T. Plate valve T is locked on the reduced end portion 94a of plunger rod 94 by means of an enlarged end means 94b which can be a nut or the like. Plate valve T is retained on valve seat 95 by means of valve spring 96. Valve spring 96 is seated in circular depressions 97 and 98 so as to extend between the plate valve T and the solenoid L. When the solenoid L is energized, as when driving in first or third speed below the car speed at which switch N opens, then plunger rod 94 is drawn upwardly by solenoid L and plate valve T is raised off valve seat 95 so as to allow the oil to flow from the pump 52 through the valve T and back to the supply sump via return line 53a. With the valve T in its open position sufficient pressure cannot be developed in the hydraulic shift cylinder G to move the piston 37 from its low speed position at the right side of the cylinder to its upshifted position at the left end of the cylinder. When the solenoid L is de-energized as when driving in first or third above the car speed at which switch N opens, or when driving in the second or fourth speed, then plunger 94 is in its extended position and valve spring 96 urges plate valve T against valve seat 95, so as to restrain escape of oil through the valve T, thus forming a closed system which builds up pressure at the shift cylinder G and moves piston 37 towards the left end of the cylinder G. This movement of piston 37 causes yoke 41 to shift direct speed clutch sleeve D into engagement with the teeth 17 of blocker 16 and, after the coast as aforesaid, sleeve D then moves to engage teeth 14 of pinion 13 and driving in the upshifted gear ratio is accomplished. It will be noted that with the plate valve T seated on valve seat 95 to form a closed system from the pump 52 through lines 53 and 59 to the cylinder G then the plate valve T still operates as a relief valve for when the pressure in this closed system becomes excessive the plate valve T will be raised off seat 95 against the pressure of valve spring 96 and oil will escape to the sump via return line 53a. Valve T thus functions to maintain a predetermined desired pressure in the supply line to the fluid motor. The reduced end portion 94a of plunger 94 allows the plate valve T to be raised off its seat 95 without movement of plunger rod 94 when the valve T is operating as a relief valve. In addition to the plunger rod 94 and the valve spring 96, guide pins of any well known type may be used to slidably mount valve T on valve seat 95.

It will be noted that with either modification disclosed the work required of the solenoid L is reduced to a minimum due to the balancing of the oil pressure beneath the valve against the spring pressure above the valve. Consequently, the solenoid L merely has to supply the small force required, in addition to that supplied by the oil pressure, to overcome the resistance of the valve spring. This arrangement permits the use of a much smaller size solenoid than would be required to overcome the entire force exerted on the valve by the valve spring. The use of a small size solenoid not only renders the system less expensive to manufacture but also lends itself to a more compact transmission unit. Furthermore, a small size solenoid requires less current than a larger sized solenoid; therefore, the drain on the electrical system is accordingly reduced.

It is apparent that in Figs. 4 and 5 of the drawings I have disclosed embodiments of my invention which provide simplified, positive, single valve control means for a hydraulically operated shift cylinder or servo-motor means for a transmission.

While I have illustrated and described but two embodiments of my invention, it is to be understood that such are for purposes of illustration only, and it is contemplated that those skilled in the art may modify certain details without departing from the spirit or scope of the invention as defined in the claims appended hereto.

I claim:

1. In a power transmission for a motor vehicle, a pressure fluid and spring actuated motor, a control element operably connected between said transmission and motor and shiftable by said motor for effecting changes in the speed ratio drive through said transmission, and a control system for said motor comprising a fluid supply, a pump operable to deliver fluid under pressure from said supply to said motor, pressure fluid conduit means connected between said pump and said motor, and a combination motor control and fluid pressure relief valve unit associated with said conduit means comprising a valve casing having a first passageway therethrough forming a part of said conduit means, a second passageway piercing said casing and intersecting said first passageway, a by-pass conduit connecting said second passageway to said fluid supply, a valve seat associated with said second passageway, a combination control and relief valve mounted in said second passageway adapted to normally engage said seat to close off communication between said passageways, resilient means normally urging said valve on said seat, a solenoid unit mounted on said casing including a reciprocable plunger bar adapted to be actuated by energization of said solenoid, means connecting said bar to said valve energization of said solenoid causing said bar to unseat said valve, and means to control energization of said solenoid comprising a first means adapted to be automatically operated and a second means adapted to be manually operated, said second means providing a means to overrule said first means.

2. In a control system for the shiftable speed ratio changing control element of a change speed transmission, a pressure fluid operated motor, means operably connecting said element to said motor for movement thereby, a source of pressure fluid, conduit means for conducting pressure fluid from said source to said motor, and a combination control and relief valve unit associated with said conduit means comprising a valve casing having a first passageway therein forming a part of said conduit means and a second passageway connected with said first passageway and adapted to provide by-pass means for the pressure fluid directed through said first passageway to said motor, a valve seat associated with one of said passageways, a combination control and relief valve mounted in said casing adapted to normally engage said seat to close off communication between said passageways, resilient means normally urging said valve into engagement with said seat, an electrically operated solenoid unit including a reciprocable plunger bar mounted on said casing, and means connecting said plunger bar to said valve and means for controlling energization of said solenoid unit comprising a first means adapted to be automatically operated by a transmission driven element and a second means adapted to be manually operated to overrule the first means and provide an alternative control for said solenoid, said plunger bar being adapted to be actuated by energization of said solenoid unit so as to unseat said valve to open said first passageway to said second passageway.

3. In a control system for a change speed power transmission, a shiftable control element to effect speed ratio changes, a pressure fluid operated motor to actuate said shiftable control element, a source of pressure fluid, conduit means for conducting pressure fluid from said source to said motor, and a combination control and relief valve assembly associated with said conduit means comprising a valve casing provided with a first passageway adapted to form a part of said conduit means and a second passageway connected with said first passageway and adapted to provide by-pass means for the pressure fluid directed through said first passageway to said motor, a valve seat associated with one of said passageways, a combination control and relief valve mounted in said casing and arranged to normally engage said seat to close off communication between said passageways, resilient means mounted in said second passageway opposing dislodgement of said valve from said seat, said resilient means cooperating with said valve and seat to provide pressure relief valve means for the pressure fluid in said system, an electrically operated solenoid unit including a reciprocable plunger bar mounted on said casing, and means connecting said plunger bar to said valve, said plunger bar being adapted to be actuated by energization of said solenoid unit to unseat said valve and open said first passageway to said second passageway to thereby control the delivery of pressure fluid to said motor and means for controlling energization of said solenoid unit comprising a first means adapted to be automatically operated by a transmission driven element and a second means adapted to be manually operated to overrule the first means and provide an alternative control for said solenoid.

4. In a hydraulic control system for a change speed transmission, a pressure fluid operated motor, a pressure fluid supply for said motor, a combination control and relief valve unit associated with said supply comprising a valve casing having a first passageway therethrough providing a pressure fluid conduit means, a second passageway piercing said casing and intersecting said first passageway adapted to provide a by-pass channel for pressure fluid directed into said first passageway, a valve seat asociated with one of said passageways, a valve mounted in said second passageway arranged to normally engage said seat and close off communication between said passageways, a compression type valve spring mounted between said valve and said casing urging said valve on said seat, an electrically operated unit mounted on said casing and provided with a plunger bar adapted to be actuated upon energization of said electrically operated unit, means connecting said plunger bar to said valve permitting relative movement between said bar and said valve whereby said valve may be moved off said seat by a predetermined pressure within said first passageway independently of actuation of said bar by said electrically operated unit and means for controlling the energization of said electrically operated unit comprising a first automatically operated means and a second manually operated means, said second means being adapted to overrule said first means.

5. In a hydraulic control system for a change speed transmission, a pressure fluid operated motor, a pressure fluid supply for said motor, a combination control and relief valve unit associated with said supply comprising a valve casing having a first passageway therethrough providing a pressure fluid conduit means, a second passageway piercing said casing and intersecting said first passageway adapted to provide a by-pass channel for pressure fluid directed into said first passageway, a valve seat associated with one of said passageways, a plate type valve mounted in said second passageway arranged to normally engage said seat and close off communication between said passageways, a compression type valve spring mounted between said valve and said casing urging said valve on said seat, an electrically operated unit mounted on said casing and provided with a plunger bar adapted to be actuated upon energization of said electrically operated unit, means connecting said plunger bar to said valve permitting relative movement between said bar and said valve whereby said valve may be moved off said seat by a predetermined pressure within said first passageway independently of actuation of said bar by said electrically operated unit and means for controlling the energization of said electrically operated unit comprising a first automatically operated means and a second manually operated means, said second means being adapted to overrule said first means.

6. In a hydraulic control system for a change speed transmission, a pressure fluid operated motor, a pressure fluid supply for said motor, a combination control and relief valve unit associated with said supply comprising a valve casing having a first passageway therethrough providing a pressure fluid conduit means, a second passageway piercing said casing and intersecting said first passageway adapted to provide a by-pass channel for pressure fluid directed into said first passageway, a valve seat associated with one of said passageways, a flapper type valve mounted in said second passageway arranged to normally engage said seat and close off communication between said passageways, a compression type valve spring mounted between said valve and said casing urging said valve on said seat, an electrically operated unit mounted on said casing and provided with a plunger bar adapted to be actuated upon energization of said electrically operated unit, means connecting said plunger bar to said valve permitting relative movement between said bar and said valve whereby said valve may be moved off said seat by a predetermined pressure within said first passageway independently of actuation of said bar by said electrically operated unit and means for controlling the energization of said electrically operated unit comprising a first automatically operated means and a second manually operated means, said second means being adapted to overrule said first means.

7. In a control system for a motor vehicle transmission, a pressure fluid and spring operated servomotor for controlling speed ratio changes in said transmission, a shiftable control element operably connected between said transmission and said servomotor and adapted to be moved by said motor from a first position to a second position by the admission of pressure fluid to said motor, said motor including spring means biasing said shiftable control element for movement from said second position to said first position, a source of pressure fluid, conduit means for conducting the pressurized fluid from said source to said motor to effect movement of said shiftable control element and cause a change in the speed ratio drive transmitted by said transmission, a bypass conduit connected to said conduit means between said source and said motor to provide for the venting of the pressure fluid from said motor and said conduit means, said bypass conduit comprising a valve unit having a bore therethrough provided with a valve seat, a valve adapted to be seated on said seat to close off the vent through said bypass conduit, resilient means yieldably biasing said valve towards said seat, said resilient means operating to maintain said valve seated when the pressure of the fluid in said conduit means is below a predetermined pressure and to permit said valve to be unseated when the pressure of the fluid in said conduit means is above said predetermined pressure thereby relieving excess pressure in said conduit means by opening the latter to said bypass conduit, and a plurality of means operable to unseat said valve to vent the pressure fluid from said motor and provide for movement of said shiftable control element by said spring actuating means from said second position to said first position to effect a change in the speed ratio drive transmitted by said transmission.

8. In a control system for a motor vehicle transmission, a pressure fluid and spring operated servomotor for controlling speed ratio changes in said transmission, a shiftable control element operably connected between said transmission and said servomotor and adapted to be moved by said motor from a first position to a second position by the admission of pressure fluid to said motor, said motor including spring means biasing said shiftable control element for movement from said second position to said first position, a source of pressure fluid, conduit means for conducting the pressurized fluid from said source to said motor to effect movement of said shiftable control element and cause a change in the speed ratio drive transmitted by said transmission, a bypass conduit connected to said conduit means between said source and said motor to provide for the venting of the pressure fluid from said motor and said conduit means, said bypass conduit comprising a valve unit having a bore therethrough provided with a valve seat, a valve adapted to be seated on said seat to close off the vent through said bypass conduit, resilient means yieldably biasing said valve towards said seat, said resilient means operating to maintain said valve seated when the pressure of the fluid in said conduit means is below a predetermined pressure and to permit said valve to be unseated when the pressure of the fluid in said conduit means is above said predetermined pressure thereby relieving excess pressure in said conduit means by opening the latter to said bypass conduit, and means operable to unseat said valve to vent the pressure fluid from said motor and provide for movement of said shiftable control element by said spring actuating means from said second position to said position to effect a change in the speed ratio drive transmitted by said transmission.

9. In a control system for a motor vehicle transmission, a pressure fluid and spring operated servomotor for controlling speed ratio changes in said transmission, a shiftable control element operably connected between said transmission and said servomotor and adapted to be moved by said motor from a first position to a second position by the admission of pressure fluid to said motor, said motor including spring means biasing said shiftable control element for movement from said second position to said first position, a source of pressure fluid, conduit means for conducting the pressurized fluid from said source to said motor to effect movement of said shiftable control element and cause a change in the speed ratio drive transmitted by said transmission, a bypass conduit connected to said conduit means between said source and said motor to provide for the venting of the pressure fluid from said motor and said conduit means, said bypass conduit comprising a valve unit having a bore therethrough provided with a valve seat, a valve adapted to be seated on said seat to close off the vent through said bypass conduit, resilient means yieldably biasing said valve towards said seat, said resilient means operating to maintain said valve seated when the pressure of the fluid in said conduit means is below a predetermined pressure and to permit said valve to be unseated when the pressure of the fluid in said conduit means is above said predetermined pressure thereby relieving excess pressure in said conduit means by opening the latter to said bypass conduit, and means operable to unseat said valve to vent the pressure fluid from said motor and provide for movement of said shiftable control element by said spring actuating means from said second position to said first position to effect a change in the speed ratio drive transmitted by said transmission, said means including a first automatically operated means to effect opening and closing of said valve and a second manually operated means to effect opening of said valve, said second means being adapted to overrule said first means.

THEODOR C. SCHELLINGER.

REFERENCES CITED

The following references are of record in the file of this patent:

UNITED STATES PATENTS

| Number | Name | Date |
|---|---|---|
| 959,618 | Schmidt | May 31, 1910 |
| 1,743,367 | Maybach | Jan. 14, 1930 |
| 1,838,668 | Frock | Dec. 29, 1931 |
| 1,890,041 | McLeod | Dec. 6, 1932 |
| 1,965,307 | Darling | July 3, 1934 |
| 2,124,374 | Mulloy | July 19, 1938 |
| 2,226,810 | Ensign et al. | Dec. 31, 1940 |
| 2,342,960 | Neracher et al. | Feb. 29, 1944 |
| 2,398,421 | Frische et al. | Apr. 16, 1946 |

FOREIGN PATENTS

| Number | Country | Date |
|---|---|---|
| 239,475 | Great Britain | Dec. 11, 1924 |